Figure 1:
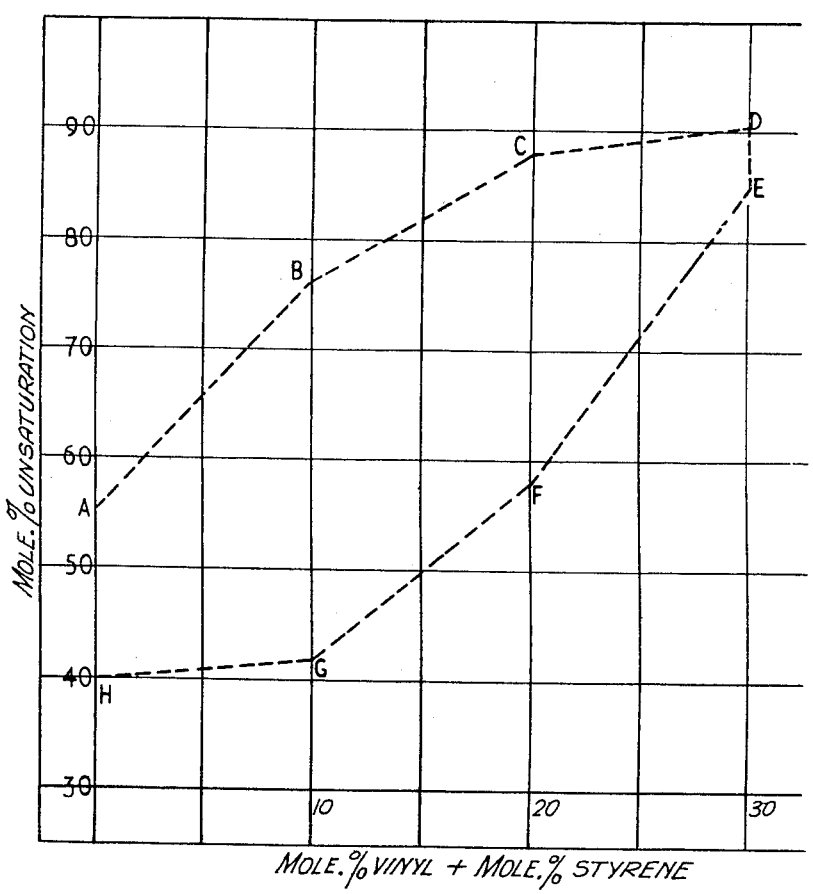

United States Patent [19]
Hawkins et al.

[11] 3,935,176
[45] Jan. 27, 1976

[54] THERMOSPLASTIC ELASTOMERIC MATERIALS

[75] Inventors: John Richard Hawkins, Southampton; John Michael Locke, Lyndhurst, both of England

[73] Assignee: The International Synthetic Rubber Co., Ltd., England

[22] Filed: Sept. 8, 1971

[21] Appl. No.: 178,549

[30] Foreign Application Priority Data
Sept. 14, 1970  United Kingdom............... 43767/70

[52] U.S. Cl. ......... 260/83.7; 260/85.1; 260/94.7 H; 260/96 H
[51] Int. Cl. ....... C08d 5/00; C08d 3/08; C08d 3/12
[58] Field of Search............. 260/85.1, 94.7 H, 83.7

[56] References Cited
UNITED STATES PATENTS
3,451,920  6/1969  De Vault et al. ............. 260/85.1 X
3,541,064  11/1970  Yoshimoto et al. ............... 260/85.1

FOREIGN PATENTS OR APPLICATIONS
621,955  6/1961  Canada.......................... 260/94.7 H OTHER PUBLICATIONS
Polymer Science & Technology, Interscience, 1967, Vol. 7, pp. 557–568.

*Primary Examiner*—William F. Hamrock
*Attorney, Agent, or Firm*—Cushman, Darby & Cushman

[57] ABSTRACT

A thermoplastic elastomeric material comprising a hydrogenated copolymer of a conjugated diene characterised in that the copolymer before hydrogenation is a random copolymer of 70 to 99 mole % of at least one conjugated diene and 30 to 1 mole % of at least one vinyl aromatic compound, is of number average molecular weight of at least 100,000, and has a vinyl content of at most 40 mole % based on total monomers, and in that the copolymer is hydrogenated to an extent such that the mole percentage saturation is in the range 40 to 90%.

8 Claims, 2 Drawing Figures

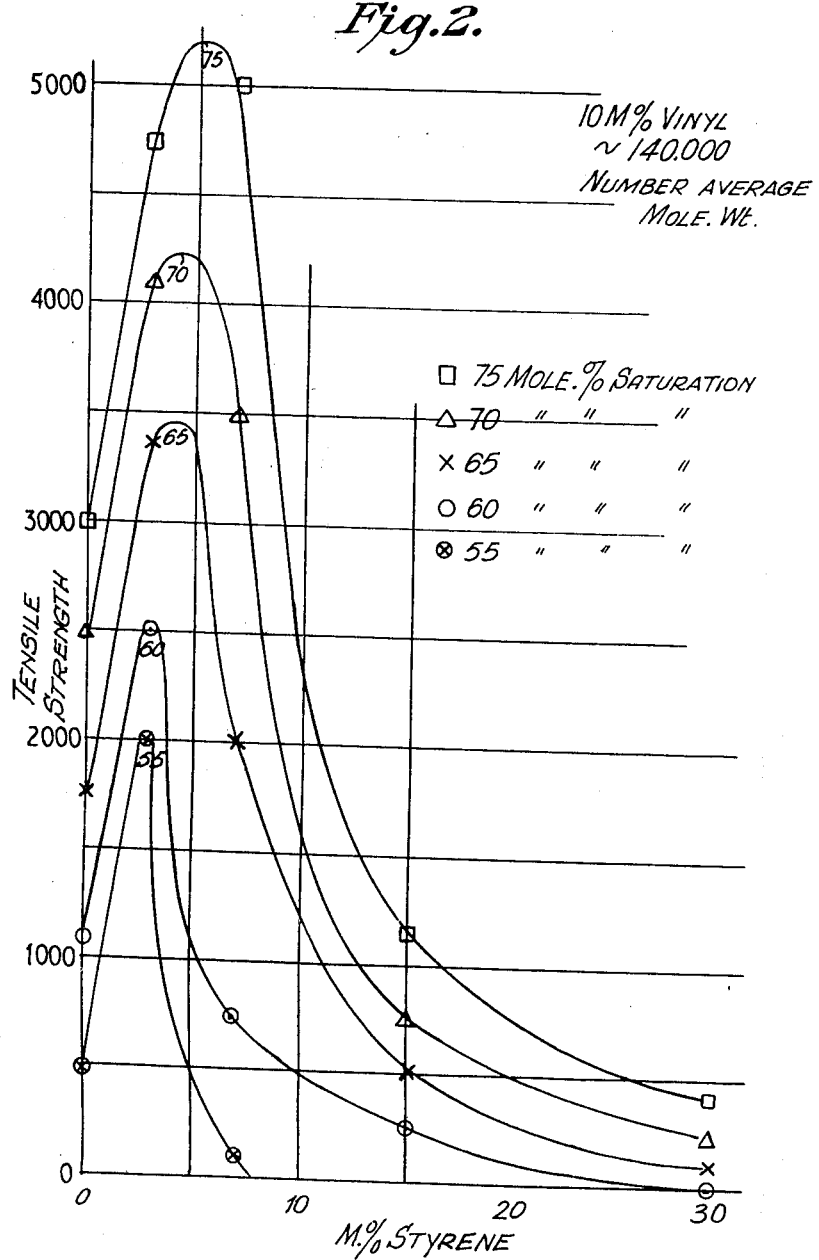

THERMOSPLASTIC ELASTOMERIC MATERIALS

This application relates to thermoplastic elastomeric materials and to a process for preparing them.

The present invention provides a thermoplastic elastomeric material comprising a hydrogenated copolymer of a conjugated diene characterised in that the copolymer before hydrogenation is a random copolymer of 70 to 99 mole % of at least one conjugated diene and 30 to 1 mole % of at least one vinyl aromatic compound, is of number average molecular weight of at least 100,000, and has a vinyl content of at most 40% based on total monomers, and in that the copolymer is hydrogenated to an extent such that the mole percentage saturation is in the range 40% to 90%. The term "vinyl content" as used in this Specification including the claims means the content of pendant groups derived from 1,2 or 3,4 addition of the diene. It thus includes vinyl homologues derived from 3,4 addition of e.g. isoprene.

Such materials are elastomeric at ambient, i.e. normally operating, conditions but at higher temperatures they become thermoplastic so that they may be processed using for example injection moulding or extrusion equipment. On cooling they revert to their elastomeric state.

The present invention also provides a process for the preparation of such a thermoplastic elastomeric material by hydrogenation of the random copolymer defined above.

The unhydrogenated copolymer from which the thermoplastic elastomer of the present invention is obtained by hydrogenation is a random copolymer of from 70 to 99 mole % of at least one conjugated diene with from 30 to 1 mole % of at least one vinyl aromatic compound. (The term "random" is used to denote that the copolymer has substantially no blocks of polymerised vinyl aromatic units present, as determined by the method of I. M. Kolthoff, T. S. Lee, C. W. Carr - J. Poly. Sci. 1 5-1946).

Examples of suitable conjugated dienes are those having 4 to 10 carbon atoms e.g. butadiene, isoprene, dimethyl butadiene, and piperylene, butadiene being preferred. Examples of suitable vinyl aromatic compounds are styrene, vinyl naphthalene and 3-methyl styrene. One or more of the ring carbon atoms in the vinyl aromatic compound may be substituted, the substituents having e.g. 1 to 8 carbon atoms and being for example methyl, ethyl or tolyl groups. Styrene is preferred. The amount of vinyl aromatic compound in the unhydrogenated copolymer is in the range 1 to 30 mole %, preferably 1.5 mole % to 20 mole %, desirably less than 10 mole %, and more preferably 2 to 7 mole %. The molecular weight of the random copolymer before hydrogenation is preferably at least 100,000 and may readily be up to e.g. 1,000,000. Desirably it is from 100,000 to 500,000. The random polymers thus have an intrinsic viscosity measured in toluene at 25°C in excess of 1.0, e.g. 1.4 to 4.0. The microstructure of the conjugated diene portion of the unhydrogenated copolymer is such that the vinyl content (based on total monomer units) is at most 40 mole %, preferably 0 to 20 mole %, more preferably 0 to 15 mole %. The microstructure is generally controlled by the polymerisation process used to prepare the unhydrogenated copolymer. Preferably a solution polymerisation is used since this leads to a substantially linear product (i.e. of low vinyl content) which is also in an ideal form of hydrogenation. Normally in such solution polymerisations an organometallic based catalyst is used, for example a lithium alkyl, aryl or aralkyl — leading to so called anionic polymerisations — or a Ziegler co-ordination catalyst e.g. an organometallic compound such as aluminium triethyl with a transition metal compound, e.g. titanium tetrachloride.

To promote the formation of a completely random copolymer, i.e. one wherein the proportion of block copolymer is at a minimum, using organometallic based catalysts, the reaction mechanism may be modified by for example including one or more "randomising agents". Such agents are well known in the art (see for instance U.K. Pat. Specifications Nos. 1,066,667 and 1,029,445) and are normally polar compounds, for example ethers, polyethers, tert-amines, polytert-amines or alkalil metal alkoxides. Particularly useful randomising agents are those which, at certain concentrations, promote the formation of a random copolymer whilst not affecting to any substantial extent the microstructure of the conjugated diene portion of the copolymer, e.g. an alkali metal alkoxide such as potassium tert-butoxide. By means of such a preferred randomising agent it is possible to obtain a random copolymer and at the same time to control the microstructure of the conjugated diene portion by the inclusion of another agent, e.g. an ether, polyether, tert-amine or polytert-amine in very small quantities. As an alternative to the inclusion of a randomising agent, the formation of a random copolymer may be promoted using for example the process disclosed in U.K. Pat. Specification No. 1,146,450. The invention is not restricted by the method of preparing the unhydrogenated copolymer.

The copolymers described above may be hydrogenated by any means provided that the degree of hydrogenation can be easily controlled. Both heterogeneous catalysts, such as Raney nickel, and homogeneous catalysts, such as those based on triphenyl phosphine-halogeno rhodium and iridium complexes, may be used. However heterogeneous catalysts are not as advantageous as homogeneous hydrogenation catalysts which are preferred. Very useful homogeneous catalyst systems are those derived from a transition metal compound such as nickel acetyl acetonate in combination with a metal alkyl such as an aluminium or lithium alkyl. Catalyst systems based on nickel di-isopropyl salicylate (dips) and a lithium organo-metallic compound such as a lithium alkyl, a lithium aluminium tetra-alkyl, a lithium trialkoxyaluminium hydride or lithium aluminium hydride are particularly effective. By means of these homogeneous catalysts, hydrogenation of the copolymer may be carried out at low e.g. substantially atmospheric, pressure in hydrocarbon solution. This is especially convenient because the hydrocarbon solution may be the same solution in which the copolymers themselves are prepared.

The degree of hydrogenation is such that the mole % saturation of the hydrogenated copolymer is in the range 40 to 90%. Degree of hydrogenation is defined by:

$$\text{Mole percent saturation} = 100 \left[ 1 - \frac{\frac{A}{B}}{\frac{C}{D} + \frac{E}{F}} \right]$$

Where:
A = Iodine number after hydrogenation
B = Molecular weight of iodine [$I_2$]
C = Vinyl aromatic content, weight %
D = Molecular weight of the vinyl aromatic compound
E = Conjugated diene content, weight %
F = Molecular weight of the conjugated diene It is thus calculated by determining the iodine number of the polymer after hydrogenation using e.g. iodine monochloride (see Lee, Kolthoff and Mairs, J. Polymer, Sci 3 66 (1968)) and inserting the appropriate values in the formula.

We have found that the mole % saturation, the mole % vinyl aromatic content of the copolymer and the mole % vinyl content of the diene portion have a profound effect on the physical properties of the resultant material e.g. tensile strength and elongation set. (Elongation set is the ratio of the residual lengthening of a test piece, expressed as a percentage of the initial length, after holding at 300% of the initial length for 10 mins. and releasing, measuring the length after one minute relaxation).

As the mole % saturation of the copolymer is increased by hydrogenation, after a certain value, e.g. 30 to 50 mole percent saturation, this value depending on the monomers constituting the copolymer, the tensile strength of the copolymer increases approximately linearly. As the proportion of vinyl aromatic monomer, e.g. styrene, is increased, there is a steep initial increase in tensile strength for any given mole % saturation, rising to a maximum (which occurs at about 5 mole % vinyl aromatic based on total monomers in the case of styrene). Increasing the vinyl aromatic content beyond this point causes a rapid decrease in tensile strength. At about 30 mole % a very low tensile strength is generally obtained although this tensile strength may be increased somewhat by increasing the degree of hydrogenation. Above this value even highly hydrogenated polymers have little strength.

Variations in the vinyl content of the conjugated diene portion of the unhydrogenated copolymer also affect the tensile strength, there being a steady decrease in tensile strength as vinyl content is increased. It is undesirable that the vinyl content of the conjugated diene portion be such that the vinyl content of the copolymer is above 40 mole % based on total monomers. For maximum tensile strength the vinyl content is in the range 0 to 12%, the tensile strength being reduced above about 12% vinyl (on total monomers). As saturation is increased there is generally a small decrease in elongation set initially, to a minimum elongation set, which generally occurs at a mole % saturation of approximately 40 to 70%, depending on the mole percent vinyl and vinyl aromatic contents, followed by an approximately linear increase. Generally beyond a mole % saturation of 60 to 90%, the exact value again depending on the mole percent vinyl and vinyl aromatic contents, the elongation set becomes large e.g. 50% or more, and the product is excessively plastic. The mole % vinyl aromatic content also affects the elongation set properties generally tending to decrease the elongation set as the content of these is increased, for any given mole percent saturation. For optimum elongation set and tensile strength properties, the vinyl aromatic and vinyl contents are chosen to give minimum elongation set at the lowest mole percent saturation possible (e.g. 50 to 70 mole %). By adjustment of degree of hydrogenation (i.e. varying mole % saturation), the percent vinyl aromatic content and the vinyl content of the conjugated diene portion, a wide variety of properties in the final material may be obtained. Generally optimum thermoplastic elastomeric properties, for example a tensile strength of at least 2,000 p.s.i., and an elongation set of 40 or less, are obtained at a low, e.g. 0 to 12%, vinyl content, a vinyl aromatic content of 2 to 7% molar and a mole percent saturation of 50 to 70%, preferably such that the total vinyl + vinyl aromatic content is in the range 10 to 20 mole percent, the percentages quoted applying to a product based on a butadiene/styrene copolymer. Optimum properties are specifically obtained by adjusting the variables within the area BCFG shown in FIG. 1 of the accompanying drawings. Within the areas ABGH and CDEF less desirable but still generally satisfactory thermoplastic elastomeric properties are obtained.

The thermoplastic elastomers of the present invention do not require the presence of the usual vulcanising agents. They may however be compounded with fillers, reinforcing agents, plasticisers, antioxidants and other ingredients as is known in the art depending on the end use of the final product. They may be formed into finished articles using moulding or forming techniques e.g. injection moulding.

The following Examples illustrate the invention:

EXAMPLES 1 – 6

Styrene/butadiene copolymers of varying styrene content were prepared in hexane using a lithium butyl/-potassium tert-butoxide catalyst. The number average molecular weight in each case was approximately 140,000 and the mole percentage vinyl 1,2 content addition of the butadiene portion was approximately 10% (based on total monomers). Each copolymer was dissolved in toluene to give a 3% weight/volume solution and the solution purged with hydrogen.

The hydrogenation catalyst was prepared under hydrogen by dissolving nickel dips and butyl lithium in toluene in the molar ratio 1:5. This catalyst solution was added to the polymer solution under hydrogen at 75°C to give a 2% weight of nickel dips based on the weight of the polymer. The mixture was stirred and the temperature maintained at approximately 75°C at atmospheric pressure whilst hydrogen was bubbled through. Hydrogenation was stopped when the desired mole % saturation had been achieved. The products were isolated by precipitation with acetone and then dried. Each sample was then compression moulded at 150°C and the tensile strength and elongation at break determined according to British Standard Specification No. 903. The elongation set of each sample was found by extending it to 300% of the original length for 10 mins. releasing it and remeasuring the length after relaxation of 1min. The increase in length is quoted as a percentage of the original length. The results obtained are indicated in the following Table.

| EXAMPLE | STYRENE CONTENT | | VINYL CONTENT | | HYDRO-GENA-TION TIME (HOURS) | IODINE NUMBER | SATU-RA-TION MOLE % | ELONGA-TION AT BREAK % | ELON-GA-TION SET % | TENSILE STRENGTH (P.S.I.) |
|---|---|---|---|---|---|---|---|---|---|---|
| | WEIGHT % | MOLAR % OF TOTAL | WEIGHT (%) OF BUTADIENE | MOLAR % OF TOTAL | | | | | | |
| 1 | 6 | 3 | 9 | 9 | 1.3 | 220 | 52 | 820 | 20 | 2000 |
| 2 | 6 | 3 | 9 | 9 | 1.7 | 184 | 60 | 670 | 40 | 2900 |
| 3 | 13 | 7 | 9 | 9 | 1.75 | 160 | 65 | 690 | 30 | 2200 |
| 4 | 27 | 15 | 12 | 10 | 2 | 120 | 70 | 1100 | 30 | 800 |
| 5 | 27 | 15 | 12 | 10 | 4 | 34 | 90 | 500 | 100 | 3800 |
| 6 | 44 | 29 | 14 | 10 | 2.75 | 106 | 70 | 540 | 40 | 170 |

Independently samples of the original copolymer rubbers were hydrogenated to different degrees of mole % saturation and their tensile strength measured. A graph of tensile strength (psi) v mole % styrene content at different mole % saturation was prepared and this is shown in FIG. 2 of the accompanying drawings.

What is claimed is:

1. A thermoplastic elastomeric material comprising a hydrogenated copolymer of a conjugated diene characterized in that the copolymer before hydrogenation is a random copolymer, having a number average molecular weight of 100,000 to 500,000, of 93 to 98 mole % of butadiene or isoprene and 7 to 2 mole % of styrene and has a vinyl content of 0 to 12 mole % based on total monomers, and in that the copolymer is hydrogenated to an extent such that the mole percentage saturation is in the range 50% to 70%.

2. A thermoplastic elastomeric material according to claim 1 characterized in that it has been prepared by hydrogenating the random copolymer defined in said claim 1 in solution using a homogeneous catalyst system.

3. A thermoplastic elastomeric material according to claim 2 characterised in that the catalyst system is derived from a transition metal compound in combination with a metal alkyl.

4. A thermoplastic elastomeric material according to claim 2 characterised in that the catalyst system is nickel di-isopropyl salicylate and a lithium organometallic compound.

5. A thermoplastic elastomeric material comprising a hydrogenated copolymer of a conjugated diene characterised in that the copolymer before hydrogenation is a random copolymer, having a number average molecular weight of 100,000 to 500,000, of 93 to 98 mole % of butadiene and 7 to 2 mole % of styrene and has a vinyl content of 0 to 12 mole % based on total monomers, and in that the copolymer is hydrogenated to an extent such that the mole percentage saturation is in the range 50% to 70%.

6. A thermoplastic elastomeric material according to claim 5 characterised in that it has been prepared by hydrogenating the random copolymer in solution using a homogeneous catalyst system derived from a transition metal compound in combination with a metal alkyl.

7. A thermoplastic elastomeric material comprising a hydrogenated random copolymer of styrene and butadiene as defined by area BCFG of FIG. 1 of the accompanying drawings.

8. An article moulded from the elastomeric material of claim 1.

* * * * *